(12) United States Patent
Yoshida

(10) Patent No.: US 8,510,742 B2
(45) Date of Patent: Aug. 13, 2013

(54) JOB ALLOCATION PROGRAM FOR ALLOCATING JOBS TO EACH COMPUTER WITHOUT INTENSIVELY MANAGING LOAD STATE OF EACH COMPUTER

(75) Inventor: Taketoshi Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1201 days.

(21) Appl. No.: 11/901,982

(22) Filed: Sep. 20, 2007

(65) Prior Publication Data

US 2008/0148272 A1    Jun. 19, 2008

(30) Foreign Application Priority Data

Dec. 19, 2006 (JP) .................................. 2006-341081

(51) Int. Cl.
*G06F 9/46* (2006.01)
(52) U.S. Cl.
USPC .......................................... 718/104; 718/103
(58) Field of Classification Search
None
See application file for complete search history.

(56) References Cited

U.S. PATENT DOCUMENTS

| | | | | | |
|---|---|---|---|---|---|
| 5,889,944 | A | * | 3/1999 | Butt et al. | 709/203 |
| 7,020,797 | B2 | * | 3/2006 | Patil | 714/4.4 |
| 7,568,199 | B2 | * | 7/2009 | Bozak et al. | 718/104 |
| 7,810,099 | B2 | * | 10/2010 | Dettinger et al. | 718/106 |
| 7,979,864 | B2 | * | 7/2011 | Meguro | 718/104 |
| 2004/0070630 | A1 | * | 4/2004 | Nagoshi et al. | 345/810 |
| 2005/0131993 | A1 | | 6/2005 | Fatula, Jr. | |
| 2005/0275881 | A1 | | 12/2005 | Akashi et al. | |
| 2008/0016508 | A1 | | 1/2008 | Goto et al. | |
| 2008/0040292 | A1 | | 2/2008 | Nakayashiki | |

FOREIGN PATENT DOCUMENTS

| | | |
|---|---|---|
| JP | 07-160647 | 6/1995 |
| JP | 2001-325041 | 11/2001 |
| JP | 2003-016043 | 1/2003 |
| JP | 2003-058266 | 2/2003 |
| JP | 2004-240671 | 8/2004 |
| JP | 2004-246592 | 9/2004 |
| JP | 2005-293492 | 10/2005 |
| JP | 2006-048273 | 2/2006 |
| WO | WO 2006/100752 A1 | 9/2006 |

OTHER PUBLICATIONS

Japanese Office Action issued in Japanese Application No. 2006-341081, dated Jan. 18, 2011.
Japanese Office Action mailed May 7, 2013 for corresponding Japanese Application No. 2012-000028, with English-language translation.

* cited by examiner

*Primary Examiner* — Camquy Truong
(74) *Attorney, Agent, or Firm* — Fujitsu Patent Center

(57) ABSTRACT

This job allocation method for allocating jobs to each computer that processes the job without intensively managing a load state of each computer includes: identifying computers having a configuration necessary for a processing of a generated job by using a profile management data storage storing data of a configuration of each computer; identifying a job allocation mode according to a current job generation state by using an allocation mode data storage storing data concerning an allocation mode of computers to the jobs in association with the job generation state; transmitting a job generation notification to at least one of the identified computers according to the identified job allocation mode; and when a job acquisition refusal notification is received in response to the job generation notification, resending a job generation notification to a computer having a configuration necessary for the generated job. Thus, by sending the job generation notification, not a job allocation notification, without intensively managing the load state of each computer, which processes the jobs, it is possible to reduce the processing load of a master computer.

5 Claims, 10 Drawing Sheets

| VALID/INVALID | SERVER NAME | OS | CPU | APPLICATION | NOTIFICATION CONDITION |
|---|---|---|---|---|---|
| VALID | SERVER A | Linux | P4 | x,y,z | — |
| ⋮ | ⋮ | ⋮ | ⋮ | ⋮ | ⋮ |

| CONDITION | DEFINITION |
|---|---|
| NO. OF JOBS ≧ NO. OF SERVERS | JOBS ARE ALLOCATED TO ALL SERVERS WITHOUT DUPLICATION |
| NO. OF JOBS < NO. OF SERVERS | SLOW SERVERS ARE LEFT AND JOBS ARE DUPLICATIVELY ALLOCATED TO OTHER IDLE SERVERS |

| JOB ID | JOB PROCESSING CONTENT | SERVER | PREVIOUS JOB ID | FOLLOWING JOB ID | JOB PROCESSING REQUIREMENT | PRIORITY | PROCESSING RESULT |
|---|---|---|---|---|---|---|---|
| 5 | C PROGRAM | SERVER B (IN PROGRESS) | 1 | — | OS[Linux] CPU[P4] | 4 | — |
| ... | ... | ... | ... | ... | ... | ... | ... |

FIG.10C

JOB ALLOCATION PROGRAM FOR ALLOCATING JOBS TO EACH COMPUTER WITHOUT INTENSIVELY MANAGING LOAD STATE OF EACH COMPUTER

TECHNICAL FIELD OF THE INVENTION

This invention relates to a job allocation technique when using plural computers having different configurations for example, which have (various processing performances in the heterogeneousness.) and being connected each other through a network (for example, of which the communication quality is not constant and unified).

BACKGROUND OF THE INVENTION

A lot of conventional grid systems adopt a Push-type job allocation method. In the Push-type job allocation method, a specific computer unitarily carries out management of processing load information for other computers, which process jobs, the job allocation and the like.

In addition, there is also a Pull-type job allocation method. This method is carried out by combining a computer, which generates jobs, and other computers, which obtain and process the jobs. Then, the computers, which obtain and process the jobs, carry out their own processing load management, transmit an acquisition request of the job based on the processing load management information to the computer, which generates the jobs, and if it is possible to obtain a job, obtain the job to process it, and notifies the computer, which generates the jobs, of the result.

Furthermore, US-2005/275881-A1 discloses a technique to shorten the entire processing time when causing plural clients to distributedly process divided jobs. Specifically, in an image forming system in which the load distribution processing is enabled by the grid computing, when the number of client apparatuses is greater than the number of divided jobs, a job scheduler allocates the same job to plural client apparatuses, and when the job is completed in any one apparatus among the plural client apparatuses to which the same job is allocated, the execution of the job is forcibly terminated in other client apparatuses. However, the client apparatus cannot refuse the job allocation, and this method is a variation of the Push-type job allocation method.

In addition, US-2005/131993-A1 discloses a technique for autonomous management of data operation and execution resources on a grid computing system. Specifically, an autonomous management apparatus includes a monitor module, a policy module, and an adjustment module. The monitor module is configured to monitor the grid computing system in order to search a trigger event. The policy module is configured to access one of plural system policies. Each of plural system policies corresponds to an operation control parameter of system resource of the grid computing system. The adjustment module is configured to autonomously adjust the system resources according to one of plural system policies in response to a recognized trigger. Although this publication discloses that the load information of the job executing computers is unitarily managed, job throwing conditions and judgment of throwing the job are not described.

Furthermore, JP-A-2006-48273 discloses a technique for providing a flexible and easy configuration for a user when throwing, from an operation unit, a grid job in an image processing system, which is composed of a system enabling the load distribution by the grid computing and an image forming apparatus, which outputs jobs to the grid. Specifically, when executing the grid job, a first mode that the execution of the job is immediately requested or a second mode that the job can be executed later is designated, and when the second mode is designated, an input image is temporarily stored, and when a request of the job becomes possible, a processing for the stored image by using the grid is carried out. When the grid job is executed, an optimum recommended grid group is selected among grouped hosts, and the grid processing is carried out using the selected grid group. However, the technique of this publication focuses on to what group the job should be allocated, and it is not considered whether or not the client should obtain the job.

As described above, the aforementioned conventional arts have the aforementioned problems.

In addition, the Push-type job allocation method has following problems. That is, once a job is allocated to a computer, the job stays in the computer and the other computers cannot process the job as long as the job is completed or deleted. In addition, even when the same job is simultaneously allocated to individual computers, a job to manage the processing results has to be newly defined. Especially, because a processing by a slow computer has to continue even when a computer having higher processing capability becomes idle, there is a problem that the entire processing time cannot be shortened. For example, it is assumed that Job (A) for which the processing capability "100" is necessary is allocated to a computer (A) having only the processing capability "10", because the other computers are busy. When only about 30% of Job (A) are completed although a computer (B) having the processing capability "200" becomes idle, the processing for Job (A) has to continue in the computer (A) as it is, in the conventional art. If Job (A) is allocated to the computer (B) when 30% of Job (A) is completed, the computer (B) must be able to process Job (A) shorter than a case where the computer (A) processes remaining 70% of Job (A), because the computer (B) can process Job (A) as a job for which the processing capability "50" is necessary. However, such a processing cannot be carried out.

In addition, as for another problem, when any fault occurs in the computer, there is a problem that it takes time to recognize the fault, and the job allocation becomes inefficient. In the Push-type job allocation method, typically, states of the computers are unitarily managed. As its typical method, a method for periodically notifying data concerning a state of the computer from each computer is adopted. In order to early detect the fault, the interval of this periodical notification has to be shortened. However, there are problems that this makes the network load high, and the loads of the notification source and destination computers become high.

On the other hand, in the Pull-type job allocation method, there is a problem that the processing capabilities of the computers are not unitarily managed, the job acquisition of each computer is left to a policy of each computer, and a combination of the processing capability required for the job and the processing capability of the computer is not always suitably made. For example, when the number of jobs is greater than the number of computers, there are problems that plural computers acquires the same job, and that any jobs to which any computer is not allocated occur, when the job acquisition is left to the policy of each computer.

As described above, in the conventional methods, there is a problem that the flexible switching of the job allocation is not carried out according to the states of the job and computers, and as a result, the long processing time is required. Especially, good points of the Push-type job allocation method and the Pull-type job allocation method cannot be utilized well.

SUMMARY OF THE INVENTION

Therefore, an object of this invention is to provide a new technique enabling flexible job allocation.

In addition, another object of this invention is to provide a new job allocation technique enabling to shorten the processing time.

Furthermore, still another object of this invention is to provide a technique for dynamically changing job allocation according to states of the job or the like without intensively managing load states of computers, which process jobs.

A job allocation method according to a first aspect of this invention is a job allocation method for allocating jobs to each computer without intensively managing a load state of each computer that processes a job. The job allocation method includes: identifying a computer having a configuration necessary for a processing of a generated job by using a profile management data storage (e.g. a server profile management table in an embodiment) storing data of a configuration of each computer; identifying a job allocation mode according to a current job generation state by using an allocation mode data storage (e.g. a job generation notification definition file in the embodiment) storing data (e.g. a job generation notification condition in the embodiment) concerning an allocation mode of computers to the jobs in association with the job generation state; transmitting a job generation notification to at least one of the identified computers according to the identified job allocation mode; and when a job acquisition refusal notification is received as a response to the job generation notification, resending a job generation notification to another computer having a configuration necessary for the generated job.

Thus, by sending the job generation notification, not a job allocation notification, without intensively managing the load state of each computer, which processes the jobs, it is possible to reduce the processing load of a master computer. Incidentally, as a result, although there is a case where the job acquisition refusal notification as a response to the job generation notification is received, the job generation notification is transmitted in such a case so that any other computer acquires the job. In addition, because the job generation notification is transmitted to one or plural computers according to the job allocation mode, it is possible to carry out flexible job allocation.

In addition, the first aspect of this invention may further include: when a job acquisition notification is received as a response to the job generation notification, registering identification information of a transmission source computer of the job acquisition notification into a job allocation data storage (e.g. a job allocation management table in the embodiment) in association with the generated job; searching the job allocation data storage to extract a job to which a processing result is not registered; identifying a job allocation mode according to a job generation state at the extraction by using the allocation mode data storage; when the identified job allocation mode allows duplicate allocation of computers to the job to which the processing result is not registered, transmitting a job generation notification to a computer having capability higher than that of the computer that currently processes the job to which the processing result is not registered, and having a configuration necessary for a processing of the job to which the processing result is not registered.

This is because there is possibility to reduce the processing time by allocating the computer according to the state change after the first allocation, again, even when a computer, which processes the job, was determined once.

In addition, the aforementioned data concerning the job allocation mode may include data representing prohibition of the allocation of a plurality of computers to the same job when the number of jobs is equal to or greater than the number of computers, and representing allowance of the allocation of a plurality of computer to the same job when the number of jobs is less than the number of computers. This is to judge, according to busyness, whether or not the duplicate allocation of the computer is allowed.

Furthermore, the aforementioned resending the job generation notification may include, when the job allocation mode represents that one computer is allocated to the generated job, carrying out the transmitting the job generation notification and subsequent processings or carrying out the identifying the computers and the subsequent processings when the job acquisition refusal notification is received from all of the identified computers. Incidentally, the receipt of the job acquisition refusal notification may be equivalent to a case where the job acquisition notification is not received within a predetermined period.

Moreover, the aforementioned resending may include, when the job allocation mode represents that the generated job is allocated to a plurality of computers, carrying out the identifying the computers and subsequent processings when the job acquisition refusal notification is received from all of the identified computers. This is because at least one computer has to process the job.

Furthermore, the first aspect of this invention may further include: judging whether or not priority of the generated job is higher than a predetermined reference; and when the priority of the generated job is higher than the predetermined reference, transmitting the job generation notification to the plurality of identified computers regardless of the job allocation mode. By carrying out such a processing, it is expected that the processing time of the job having the high priority is shortened.

In addition, the aforementioned identifying said computers may include: judging whether or not the number of executions of an application used by the generated job is less than the total number of licenses; when it is judged that the number of executions of the application used by the generated job is less than the total number of licenses, identifying computers to which the application is installed and which has other configuration necessary for the processing of the generated job. In a case of a floating license, such a processing enables the proper allocation. Incidentally, in a case of a fixed license, the proper allocation can be carried out based on only the configuration of the computer.

In addition, when the generated job is a majority-decision type job to which the number of calculations is designated, each calculation processing may be handled as one job. For example, when the odd numbers of jobs are generated and a computer is allocated to each job, it becomes possible to identify the result by the majority decision.

Furthermore, the first aspect of this invention may further include: when the generated job is a majority-decision type job to which the number of calculations is not designated, transmitting the job generation notification to a predetermined number of identified computers.

A job allocation method according to a second aspect of this invention includes: identifying computers having a configuration necessary for a processing of a generated job by using a profile management data storage storing data concerning the configurations of the computers; identifying a job allocation mode according to a current job generation state by using an allocation mode data storage storing data concerning an allocation mode of the computer to the job in association with the job generate state; transmitting a job generation notification to at least one of the identified computers according to the identified job allocation mode; when a job acquisition notification is received as a response to the job generation notification, registering identification information of a transmission source computer of the job acquisition notification in association with the generated job into a job allocation data storage; searching the job allocation data storage to extract a job to which a processing result is not registered; identifying a job allocation mode according to the job generation state at the extraction by using the allocation mode data storage; when the identified job allocation mode allows duplicate allocation of a computer to the job to which the processing result is not registered, transmitting the job generation notification to a computer having a configuration necessary for a processing of the job to which the processing result is not registered and having capability higher than the computer, which currently processes the job to which the processing result is not registered. Thus, by dynamically switching the job allocation mode, the processing time is shortened.

Incidentally, it is possible to create a program for causing a computer to execute these methods according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

BRIEF DESCRIPTION OF THE DRAWINGS

FIG. 10C is a diagram showing an example of a job allocation management table.

DETAILED DESCRIPTION OF THE PREFERRED EMBODIMENTS

Figure 1:
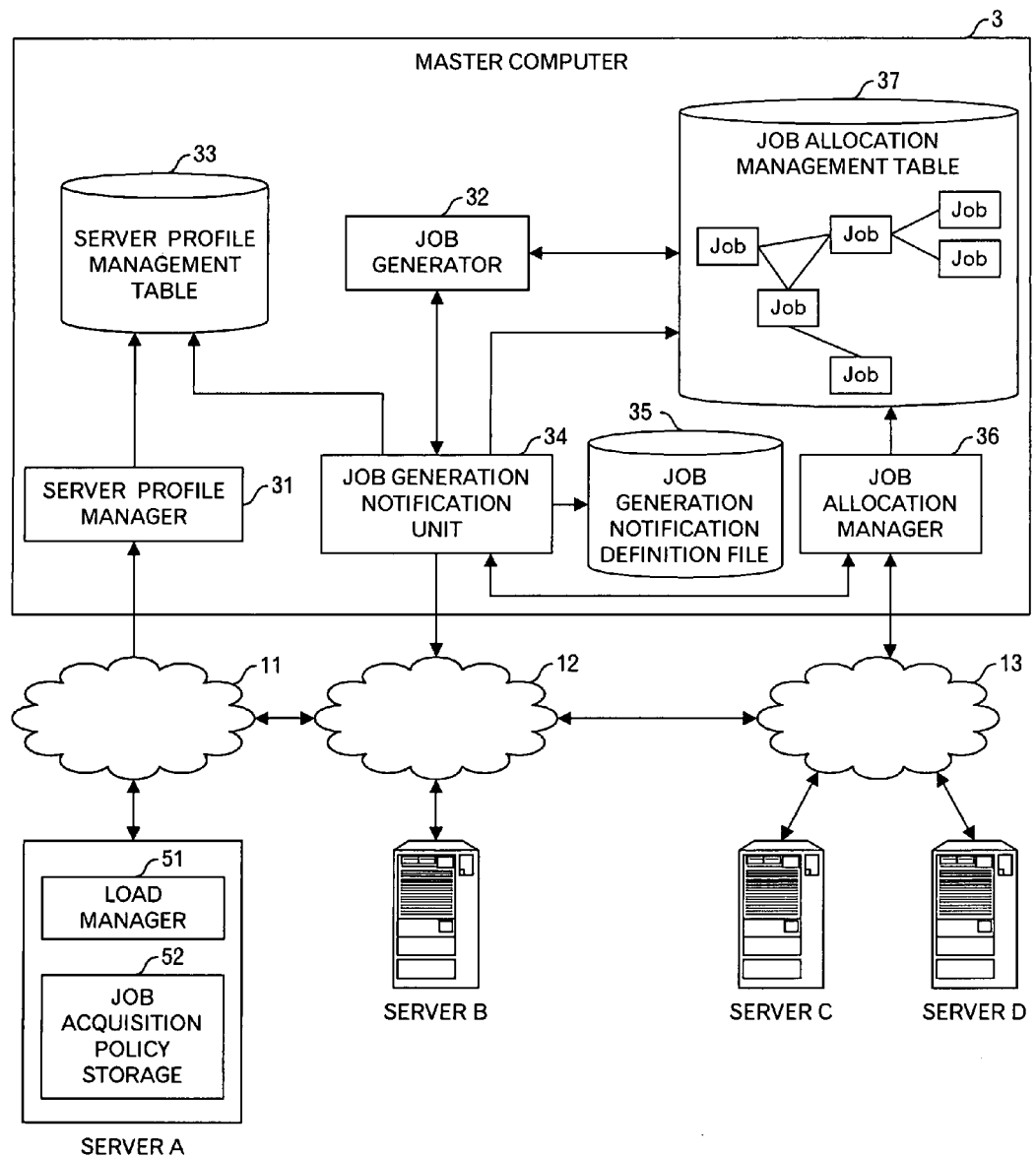
FIG. 1 is an outline diagram showing a system in an embodiment of this invention.

FIG. 1 shows a system outline in an embodiment of this invention. For example, a master computer 3, which carries out a main processing in this embodiment, and servers A to D, which are managed by the master computer 3, and to which a job generation notification is transmitted, are connected to networks 11 to 13. The communication quality of the networks 11 to 13 is not constant and unified.

Each of the servers A to D has a load manager 51 that measures a utilization ratio of a Central Processing Unit (CPU) or a memory or the like and judges whether or not the job generation notification can be accepted; and a job acquisition policy storage 52 that stores a job acquisition policy that is data concerning a reference used by the load manager 51 to judge whether or not the job generation notification can be accepted. The servers A to D have different processing capabilities and Operating Systems (OS) and hardware architectures of them are different.

In addition, the master computer 3 has a server profile management table 33 storing profile information of each server managed by the master computer 3; a job generator 32 that carries out a processing to generate jobs; a job allocation management table 37 storing data concerning the job generated by the job generator 32; a job generation notification definition file 35 that defines notification modes of the job generation notification; a job generation notification unit 34 that transmits the job generation notification to an appropriate server by using the server profile management table 33, the job allocation management table 37 and the job generation notification definition file 35; a server profile manager 31 that receives profile information from each server when registering as a computer resource which must connect with the network, and stores the profile information into the server profile management table 33; and a job allocation manager 36 that receives data from servers to which the job generation notification was transmitted, and, if necessary, registers the data into the job allocation management table 37. The job allocation manager 36 and job generation notification unit 34 cooperate each other.

Figures 10A, 10B, 11:
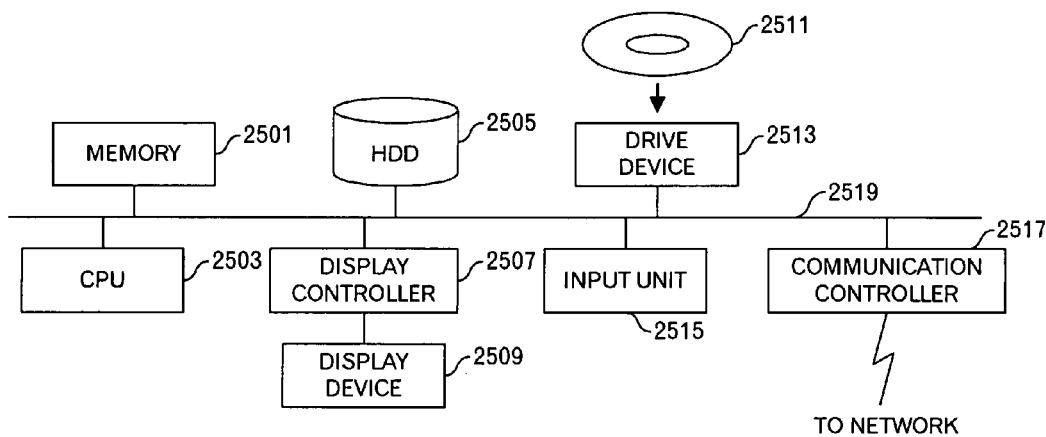
FIG. 10A is a diagram showing an example of a server profile management table.
FIG. 10B is a diagram showing an example of a job generation notification definition file.
FIG. 11 is a functional block diagram of a computer.

As shown in FIG. 10A, the server profile management table 33 stores, for each server, a notification condition of the job generation notification and configuration information such as OS, CPU type, executable application and the like. As for a specific application, the number of licenses, which can be used in the entire system, has been determined. However, when the specific application is installed into the servers of the number greater than the number of licenses, the total number of licenses for the specific application is managed in the server profile management table 33. Incidentally, in this embodiment, an item for a server, which became out of the management by the master computer 3, is deleted or invalidated in the server profile management table 33.

The job generation notification definition file 35 stores a job generation notification condition to the servers. For example, as shown in FIG. 10B, the job generation notification definition file 35 stores a notification policy of the job generation notification in a case where the number of jobs, which are registered in the job allocation management table 37 and to which the processing result is not registered, is equal to or greater than the number of servers to which the job can be allocated (e.g. the job is allocated to all servers without the duplication.) and a notification policy of the job generation notification in a case where the number of jobs, which are registered in the job allocation management table 37 and to which the processing result is not registered, is less than the number of servers to which the job can be allocated (e.g. two servers whose capability is low are left, and the jobs are allocated to other plural idle servers with the duplication.). Incidentally, the job generation notification definition file 35 stores the default number of servers, which is used when the job to be processed is a majority-decision type job (specifically, a job that the calculation result is different every calculation, and the calculation result is adopted based on the majority decision.) and the number of servers to which the job should be allocated is not designated.

The job allocation management table 37 manages data of the jobs generated by the job generator 32 by a tree structure as shown in FIG. 1. As shown in FIG. 10C, data of each job includes a job processing content (e.g. C program), a list of servers, which acquire this job and a state of the job, previous and following job IDs (link information of the job), a job processing requirement (e.g. OS type and CPU type), priority of the job and a job processing result. The job processing result is not registered unless the processing is completed.

Next, a processing content of the system shown in FIG. 1 will be explained by using FIGS. 2 to 9. First, a processing of the job generator 32 will be explained by using FIG. 2. The job generator 32 firstly generates one job according to a request from a user or the like (step S1), and registers job information such as a job processing content, a job processing requirement, and a job priority into the job allocation management table 37 (step S3). When there is a relation with other jobs, the previous and/or following Job IDs are also registered. Then, the job generator 32 notifies the job generation notification unit 34 of the job (specifically, the Job ID) (step S5). After that, the job generator 32 judges whether or not all of the jobs are registered (step S7). When there is a job to be registered, the processing returns to the step S1, and when all of the jobs have been registered, the processing is completed. Because the job generation itself is the same as the conventional one, the further explanation is omitted.

Next, a processing when a job is allocated to a server will be explained by using FIG. 3. The job generation notification unit 34 receives a job generation notification (e.g. a notification of Job ID) from the job generator 32 (step S11). Then, the job generation notification unit 34 reads out the job processing requirement and the like relating to the notification from the job allocation management table 37 (step S13). After that, the job generation notification unit 34 searches the server profile management table 33 to extract servers satisfying the job-processing requirement (step S15). For example, plural servers are extracted at this step. Incidentally, when any server cannot be extracted, the job generation notification unit 34 waits at this step until any server is extracted.

After that, the job generation notification unit 34 reads out a job generation notification condition to the servers from the job generation notification definition file 34 (step S17). As described above, according to the job generation notification definition file 35 in this embodiment, the job allocation mode is changed depending on the number of jobs, that is, a case where the number of jobs is equal to or greater than the number of servers or a case where the number of jobs is less than the number of servers.

Then, the job generation notification unit 34 transmits a job generation notification to a server(s) extracted at the step S15 according to the job generation notification condition (step S19). The job generation notification includes the Job ID, and all data necessary for the job execution. When such a job generation notification condition that plural servers are allocated to one job is applied (in the following, called a case A), the job generation notification unit 34 transmits the job generation notification to the servers of the number following the job generation notification condition among the servers extracted at the step S15. On the other hand, when such a job generation notification condition that one server is allocated to one job is applied (in the following, called a case B), the job generation notification unit 34 transmits the job generation notification to one server whose condition is best among the servers extracted at the step S15. Incidentally, the job generation notification unit 34 outputs IDs of the transmission destination servers of the job generation notification to the job allocation manager 36.

A processing of the server, which received the job generation notification, will be explained by using FIG. 4A. First, the load manager 51 of the server receives the job generation notification (step S31), and reads out a job acquisition policy from the job acquisition policy storage 52 (step S33). Furthermore, the load manager 51 acquires a load index such as a CPU utilization ratio or a memory utilization ratio (step S35). The content of this step is the same as the conventional one. Therefore, the detail explanation is omitted here. Then, the load manager 51 judges whether or not the acquired load index follows the job acquisition policy (step S37). For example, when such a job acquisition policy that a job is acquired when the CPU utilization ratio is equal to or less than 70% is defined, the load manager 51 judges whether or not the CPU utilization ratio is equal to or less than 70%. When it is judged that the acquired load index does not follow the job acquisition policy, the load manager 51 transmits a job acquisition refusal notification including the Job ID to the master computer 3 (step S39). On the other hand, when it is judged that the acquired load index follows the job acquisition policy, the load manager 51 transmits a job acquisition notification including the Job ID to the master computer 3 (step S41). Such a processing is carried out every time when the job generation notification is received.

Incidentally, the load manager 51 notifies the server profile manager 31 of information representing whether or not this server accepts the job allocation, information representing whether or not the update of the profile information exists. The server profile manager 31 updates the server profile management table 33 according to the notification from the load manager 51. Incidentally, when the server transmits the job acquisition notification, the server starts the job processing, and when the processing is completed, the server transmits the processing result to the job allocation manager 36.

Figure 3:
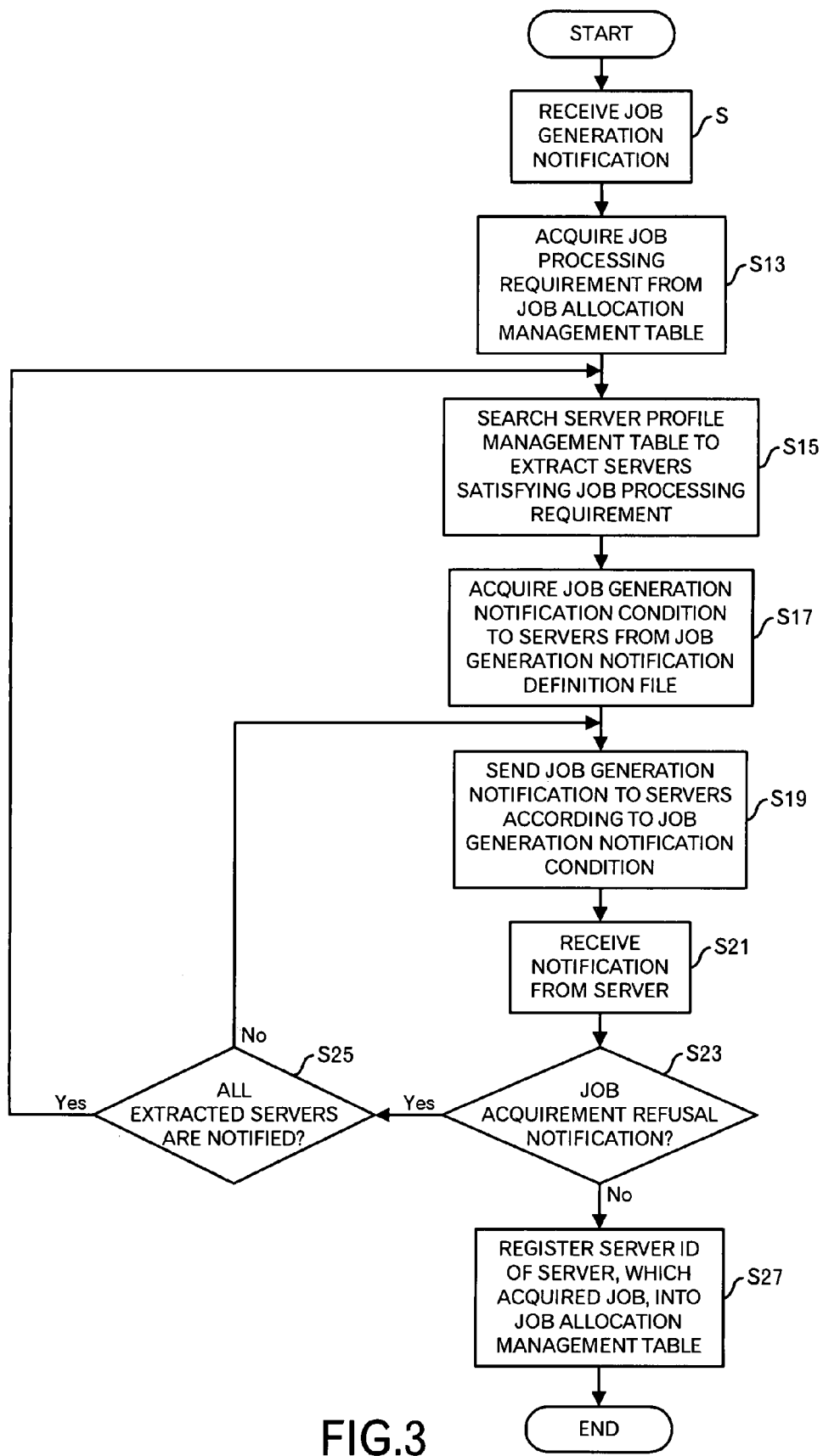
FIG. 3 is a diagram showing a processing flow when a job generation notification is transmitted.

Returning to the explanation of FIG. 3, the job allocation manage 36 receives the job acquisition notification or job acquisition refusal notification from the server (step S21), and judges whether or not the job acquisition refusal notification is received (step S23). In a case of the case A, the job allocation manager 36 judges whether or not the job acquisition refusal notification is received from all of the transmission destination servers of the job generation notification. In a case of the case B, the job allocation manager 36 judges whether or not the job acquisition refusal notification was received from the transmission destination server of the job generation notification. Incidentally, a case where the job acquisition notification or the job acquisition refusal notification is not received within a predetermined time is also handled as receipt of the job acquisition refusal notification. When the job acquisition refusal notification is received, the job allocation manager 36 judges whether or not the job generation notification is transmitted to all of the servers extracted at the step S15 (step S25). In the case of the case A, because it is judged at the step S23 that the job acquisition refusal notification was received from all of the transmission destination servers, the processing automatically shifts to the step S15. On the other hand, in the case of the case B, when plural servers were extracted at the step S15, the job allocation manager 36 judges whether or not the job generation notification has been transmitted to all of them.

When a server to which the job generation notification has not been transmitted exists, the processing returns to the step S19. On the other hand, when such a server to which the job generation notification has not been transmitted does not exist, the processing returns to the step S15. Thus, by repeatedly refer to the server profile management table 33 for the job to which any server is not allocated in the job allocation management table 37, at least one server is allocated.

Incidentally, in this processing flow, the servers, which transmitted the job acquisition refusal notification once, may be managed so as not to transmit the job generation notification again.

On the other hand, when the job acquisition notification, not the job acquisition refusal notification, is received, the job allocation manager 36 registers the job acquisition server ID in association with data of that job in the job allocation management table 37 (step S27). In the case of the case A, when the job acquisition notification is received from one server, the server ID of that server is registered. When the job acquisition notification is received from plural servers, all of the server IDs of those servers are registered. In the case of the case B, because the job is allocated to one server, the server ID of that server is registered.

By carrying out such a processing, the job allocation is carried out according to the job generation notification condition stored in the job generation notification definition file 35. More specifically, when there are a lot of jobs, one job is allocated to one server, and when there are few jobs, one job is allocated to one or more servers so as to adopt the processing result of the server that completes the job processing most early.

In addition, because each server itself judges whether or not it can respond to the job generation notification, the master computer 3 has not to monitor the operation state of each server. Therefore, the processing load of the master computer 3 is reduced. In addition, when the fault occurs in a certain server, the job generation notification is resent to another server because the job acquisition notification is not replied.

However, a simple job allocation like the conventional arts is not carried out. In this embodiment, a point that the job allocation is determined as a result that the server judges based on its own load or the like whether or not the job acquisition notification should be transmitted or the job acquisition refusal notification should be transmitted in response to the job generation notification corresponds to the Pull-type job allocation.

Incidentally, when the server completes the job processing, the server notifies the job allocation manager 36 of the job processing result. The job allocation manager 36 receives and registers the job processing result in association with the pertinent job data. In addition, in a case where plural computers are allocated to that job, when the job allocation manager 36 receives the job processing result from one server among the plural servers, the job allocation manager 36 transmits a job control notification to notify the other servers of the job completion to cause the other servers to terminate the job processing. This is because the resources allocated to the job becomes useless.

In addition, even in the case of the case A, if it is the worst case, the job is allocated to only one server in the aforementioned processing flow. In order to avoid such a case, when the job acquisition notification is not received from two or more servers, the processing may shift from the step S23 to the step S25.

Figure 4A:
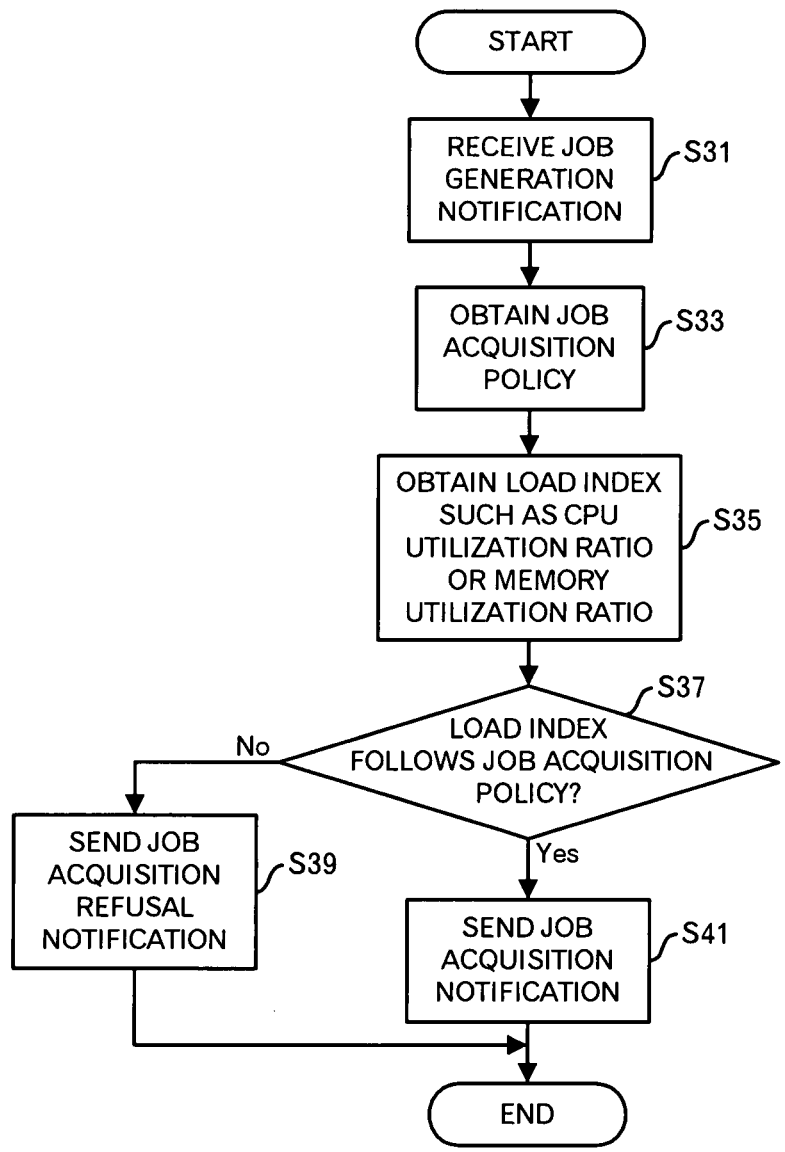
FIG. 4A is a diagram showing a processing flow of each server.
Figure 4B:
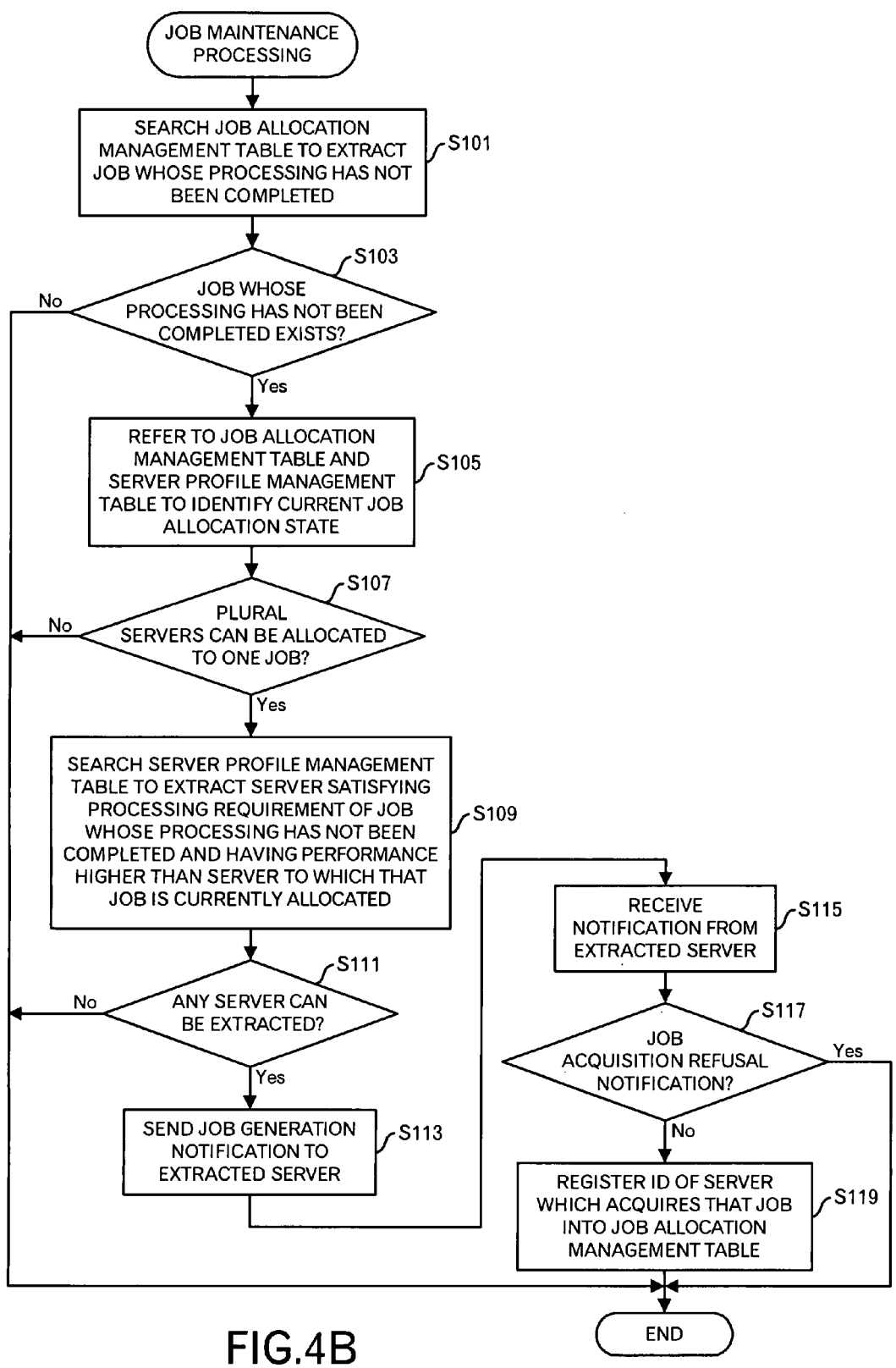
FIG. 4B is a diagram showing a processing flow of a job maintenance processing.
Figure 5:
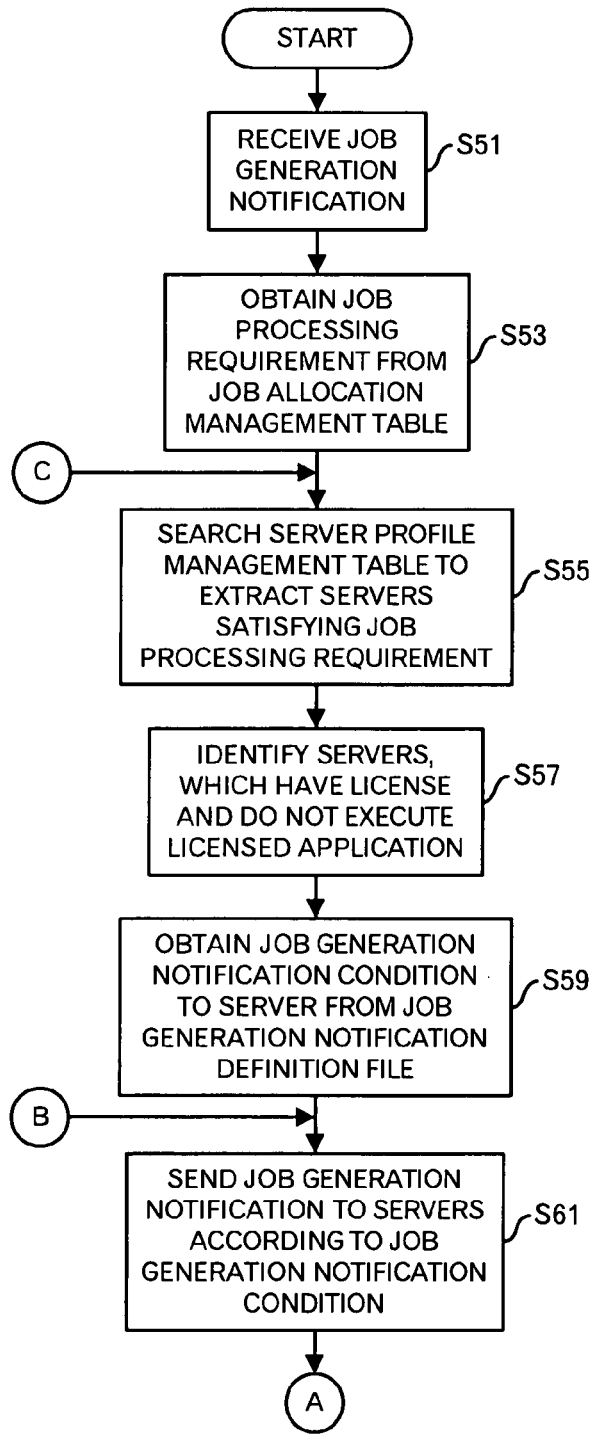
FIG. 5 is a diagram showing a processing flow when application licenses are considered.

In addition, the processing shown in FIG. 4B is also executed as a thread other than the threads of FIGS. 3 and 4A, periodically or at an arbitrary timing. First, the job generation notification unit 34 searches the job allocation management table 37 to extract jobs whose processing has not been completed yet (step S101). That is, the jobs to which the processing result is not registered are identified. When there is at least one job whose processing has not been completed, data for the job whose processing has not been completed is also read out. Then, the job generation notification unit 34 judges whether or not there is a job whose processing has not been completed (step S103), and when there is no job whose processing has not been completed, the processing is terminated. On the other hand, when there is a job whose processing has not been completed, the job generation notification unit 34 refers to the job allocation management table 37 and the server profile management table 33 to identify the current job allocation state (step S105). That is, the number of jobs and the number of servers are identified. Then, the job generation notification unit 34 judges based on the job generation notification condition stored in the job generation notification file 35 whether or not plural servers can be allocated to one job (step S107). In the aforementioned example, when the number of jobs is less than the number of servers, plural servers can be allocated to one job. When plural servers cannot be allocated to one job, that is, when the number of jobs is equal to or greater than the number of servers, the processing is terminated.

Then, when it is judged that the plural servers can be allocated to one job, the job generation notification unit 34 searches the server profile management table 33 to extract a server, which satisfies the processing requirement of the job whose processing has not been completed and has performance higher than that of the server to which the job is currently allocated (e.g. a server whose condition is better. Specifically, the processing speed of the CPU is high or the like) (step S109). The following processing is carried out for each job, when plural jobs are extracted at the step S101. The job generation notification unit 34 judges whether or not the server can be extracted at the step S109 (step S111), and when the server is not extracted, the processing is terminated. On the other hand, when the server can be extracted at the step S109, the job generation notification unit 34 transmits the job generation notification to the extracted server (step S113). In response to this notification, the server carries out the processing shown in FIG. 4A. Then, the server transmits the job acquisition notification or the job acquisition refusal notification to the master computer 3.

The job allocation manager 36 of the master computer 3 receives the job acquisition notification or the job acquisition refusal notification from the server (step S115). Then, the job allocation manager 36 judges whether or not the job acquisition refusal notification was received (step S117), and when the job acquisition refusal notification is received, the processing is terminated. On the other hand, when the job acquisition notification is received, the job allocation manager 36 registers an ID of the server that acquires the job in association with the data of that job in the job allocation management table 38 (step S119). Then, the processing is completed.

By carrying out such a processing, even in a case where only a server having low capability is allocated, when some servers become idle after that, because of the decrease of the number of jobs or the increase of the number of servers, the processing result can be obtained early by allocating the server having high capability to that job later. Incidentally, a case can be handled where the server, which processes the job, freezes and where any defect occurs in the network.

Next, as variations of the aforementioned processing, a processing content in a case where the license of the program is taken into consideration will be explained. As a first variation, a processing when the server has a fixed license for a specific application will be explained by using FIGS. 5 and 6.

First, the job generation notification unit 34 receives a job generation notification (notification of Job ID) from the job generator 32 (step S51). Then, the job generation notification unit 34 reads out a job-processing requirement relating to the notification from the job allocation management table 37 (step S53). Then, the job generation notification unit 34 searches the server profile management table 33 to extract servers satisfying the job-processing requirement (step S55). For example, plural servers are extracted at this step.

Furthermore, the job generation notification unit 34 refers to the job allocation management table 37 to identify servers, which have the license and do not execute the program of the license, among the servers extracted at the step S55 (step S57). Then, the job generation notification unit 34 reads out a job generation notification condition to the server from the job generation notification definition file 35 (step S59).

After that, the job generation notification unit 34 transmits the job generation notification to the server identified at the step S57 according to the job generation notification condition (step S61). The job generation notification includes the Job ID and further includes data necessary for the job execution. In the case of the case A, the job generation notification unit 34 transmits the job generation notification to the servers of the number following the job generation notification condition among the servers identified at the step S57. On the other hand, in the case of the case B, the job generation notification unit 34 transmits the job generation notification to one server whose condition is the best among the servers identified at the step S57. Incidentally, the job generation notification unit 34 outputs an ID of the transmission destination server of the job generation notification and the like to the job allocation manager 36.

On the other hand, the processing at the server side is the same as that shown in FIG. 4A.

Figure 6:
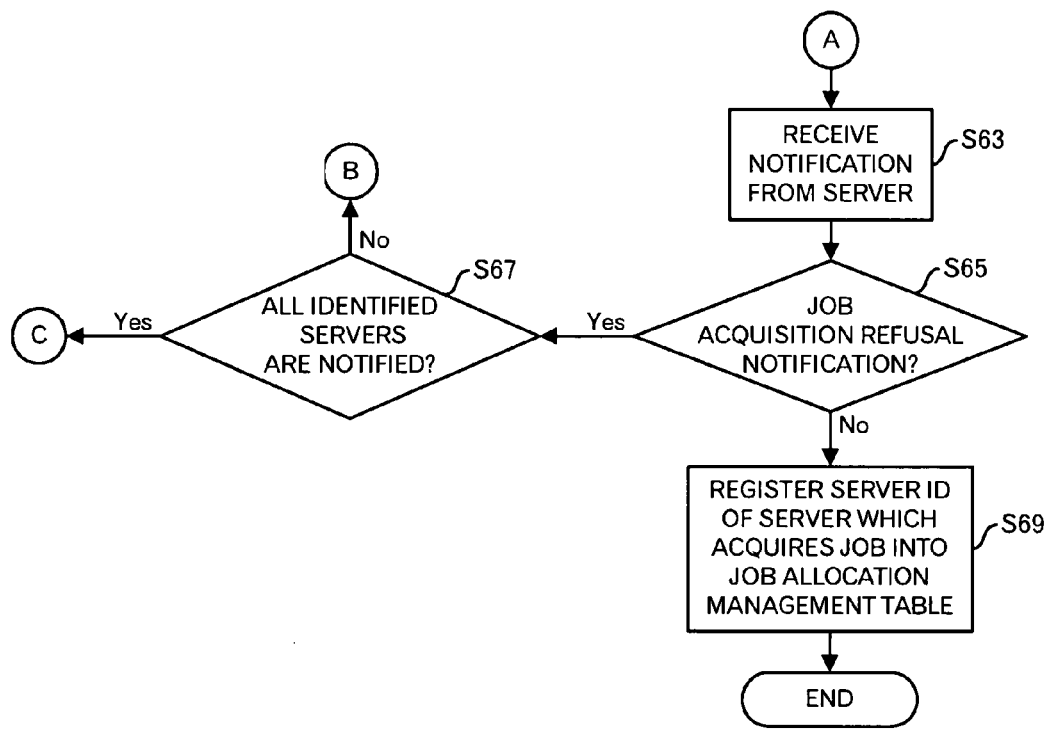
FIG. 6 is a diagram showing a processing flow when the application licenses are considered.

Shifting to a processing of FIG. 6 through a terminal A, the job allocation manager 36 receives a job acquisition notification or a Job acquisition refusal notification from the server (step S63), and judges whether or not the job acquisition refusal notification was received (step S65). In the case of the case A, the job allocation manager 36 judges whether or not the job acquisition notification was received from all of the transmission destination servers of the job generation notifications. In the case of the case B, the job allocation manager 36 judges whether or not the job acquisition refusal notification was received from the transmission destination server of the job generation notification. When the job acquisition refusal notification was received, the job allocation manager 36 judges whether or not the notification has been transmitted to all of the servers identified at the step S57 (step S67). In the case of the case A, because it was judged at the step S65 that the job acquisition refusal notification was received from all of the transmission destination servers of the job generation notifications, the processing automatically shifts to the step S55 through a terminal C. On the other hand, in the case of the case B, when plural servers are identified at the step S57, the job allocation manager 36 judges whether or not the job generation notification has been transmitted to all of them.

When there is a server to which the job generation notification has not been transmitted, the processing returns to the step S51 through a terminal B. On the other hand, when there is no server to which the job generation notification has not been transmitted, the processing returns to the step S55 through the terminal C.

On the other hand, when the job acquisition notification, not the job acquisition refusal notification, was received, the job allocation manager 36 registers a server ID of the server, which acquires that job, in association with data of that job in the job allocation management table 37 (step S69). In the case of the case A, when the job acquisition notification was received from one server, the server ID of that server is registered. When the job acquisition notification is received from the plural servers, the server IDs of all of those servers are registered. In the case of the case B, because the job is allocated to one server, the server ID of that server is registered.

Thus, a case where the fixed license of the application is allocated to the server can be appropriately handled.

Incidentally, the processing flow of FIG. 4B is also executed as another thread.

By carrying out such a processing, a case where the license of the application should be taken into consideration can be appropriately handled.

In addition, a case where the applications of the number greater than the total number of licenses are installed into the servers, and the number of servers, which simultaneously execute the application, is limited to the total number of licenses can be handled by carrying out a following processing instead of the step S57. Specifically, the job generation notification unit 34 judges whether or not the number of servers, which are executing the licensed application necessary for the job execution, is less than the total number of licenses. The total number of licenses is managed for each application in the server profile management table 33. The number of servers, which are executing the licensed application necessary for the job execution, is counted by searching the job allocation management table 37. Here, when the number of servers, which are executing the licensed application necessary for the job execution, is equal to the total number of licenses, the licensed application cannot be executed any more. Therefore, the licensed application is not executed until the execution of the licensed application is terminated in any one of the servers.

Then, when the number of servers, which are executing the licensed application necessary for the job execution, is less than the total number of licenses, the job generation notification unit 34 extracts the servers, which do not execute the licensed application. The servers to which the licensed application is installed is identified from the server profile management table 33, and it is judged by searching the job allocation management table 37 whether or not that server does not execute the licensed application.

Thus, a case where the floating license method is adopted can be appropriately handled.

Figure 7:
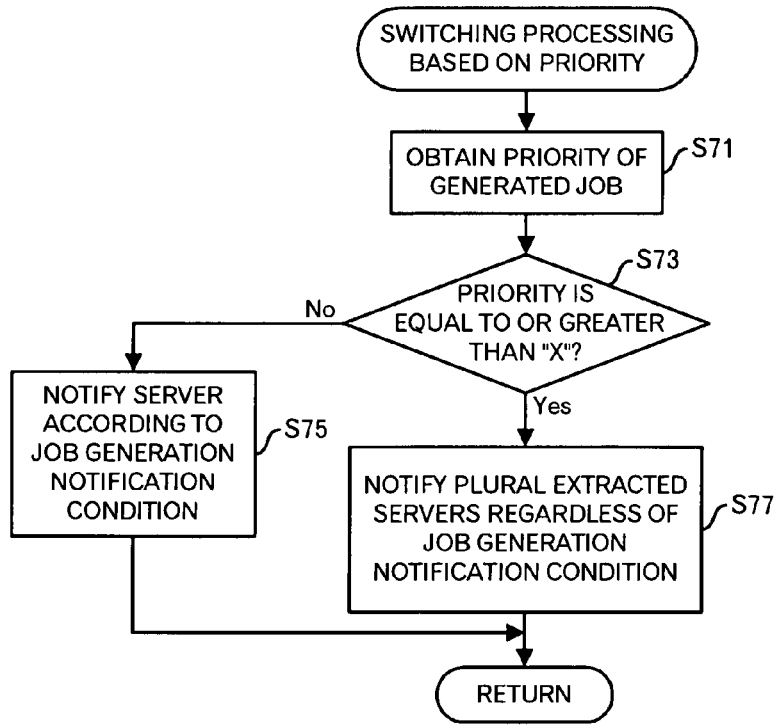
FIG. 7 is a diagram showing a processing flow of a switching processing based on priority.

Next, a variation in a case where the priority of the job is considered will be explained by using FIG. 7. The processing described below is carried out instead of the step S19 of FIG. 3.

First, the job generation notification unit 34 obtains the priority of the generated job from the job allocation management table 37 (step S71). Then, the job generation notification unit 34 judges whether or not the priority is equal to or greater than a predetermined value "X" (step S73). In a case where the priority value of the job to be preceded becomes greater, such judgment is carried out. In a case where the priority value of the job to be preceded becomes lesser, it is judged that the priority is equal to or less than the predetermined value "X".

When the priority is less than the predetermined value "X", the job generation notification unit 34 transmits the job generation notification to the server extracted at the step S15 according to the job generation notification condition (step S75). The same processing as explained for the step S19 is carried out. On the other hand, when the priority is equal to or greater than the predetermined value "X", the job generation notification unit 34 transmits the job generation notification to plural servers extracted at the step S15 regardless of the job generation notification condition (step S77). That is, in the case where the priority is equal to or greater than the predetermined value "X", similarly to the case A, it becomes possible to obtain the processing result as soon as possible by allocating that job to the plural servers satisfying the job-processing requirement.

Thus, by switching the job allocation according to the priority, the processing result can be obtained as soon as possible when the priority is high.

Next, a variation that the majority-decision type job that the calculation result is identified by the majority decision because the calculation result is different every time is handled will be explained by using FIGS. 8 and 9.

Figure 2:
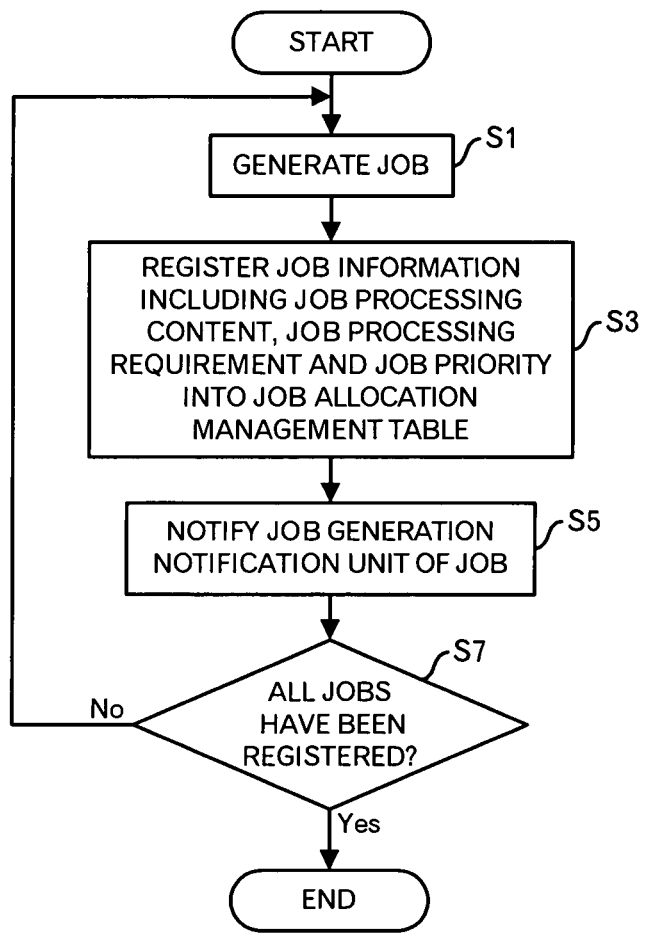
FIG. 2 is a diagram showing a processing flow of a job generator.
Figure 8:
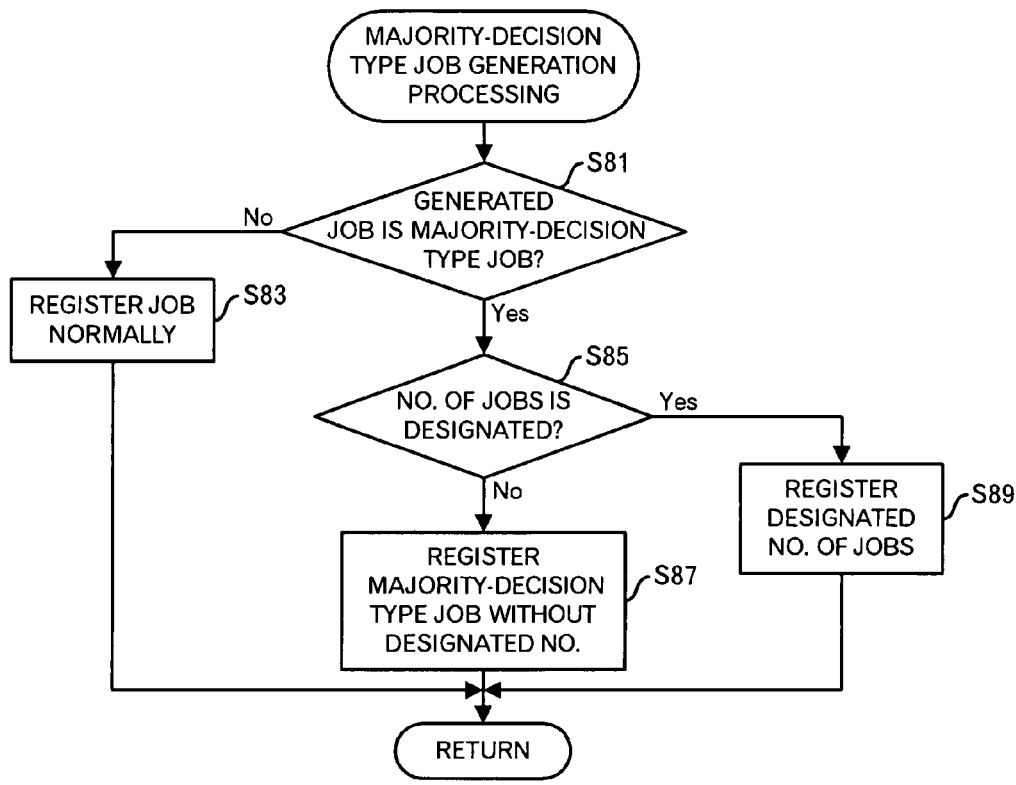
FIG. 8 is a diagram showing a processing flow of a majority-decision type job generation processing.
Figure 9:
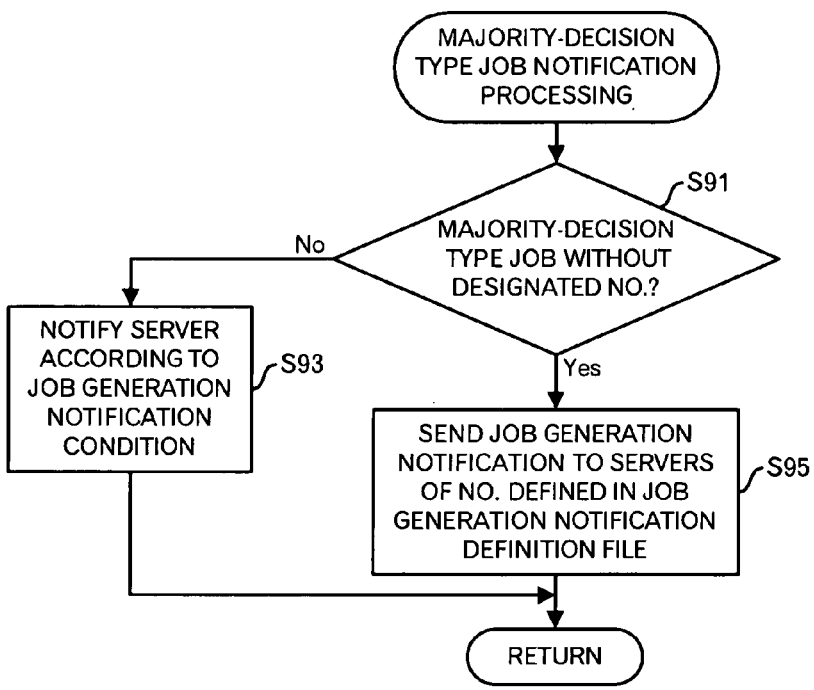
FIG. 9 is a diagram showing a processing flow of the majority-decision type job notification processing.

Basically, the job generator 32 carries out a processing of FIG. 8 instead of the step S3 of FIG. 2. First, the job generator 32 judges whether or not the generated job is a majority-decision type job (step S81). When the generated job is not any majority-decision type job, the job generator 32 normally registers job data into the job allocation management table 37 (step S83). Then, the processing returns to the original processing.

On the other hand, when the generated job is the majority-decision type job, the job generator 32 judges whether or not the number of jobs is designated (step S85). When the number of jobs is not designated, the job generator 32 registers the job data as the majority-decision type job without designated number into the job allocation management table 37 (step S87). Then, the processing returns to the original processing.

In addition, when the number of jobs is designated, the job generator 32 registers data of the designated number of jobs into the job allocation management table 37 (step S89). The data items of the designated number of jobs are respectively registered in the job allocation management table 37 in parallel. More specifically, a parent node is a node for the entire majority-decision type job, and child nodes for each of jobs are arranged under the parent node in parallel (i.e. in the same row). Then, the processing returns to the original processing.

Thus, when the number of jobs is designated, each job is registered into the job allocation management table 37. On the other hand, when the number of jobs is not designated, the job is registered as a majority-decision type job without the designated number, and when the job generation notification is actually transmitted, the job is allocated to the predetermined number of servers.

Next, a job notification processing in a case of such a majority-decision type job will be explained by using FIG. 9. The job generation notification unit 34 carries out a following processing instead of the step S19.

First, the job generation notification unit 34 judges whether or not the job read out from the job allocation management table 37 is the majority-decision type job without the designated number (step S91). When the job is not the majority-decision type job without the designated number, the job generation notification unit 34 transmits the job generation notification to the server identified at the step S15 according to the job generation notification condition (step S93). Incidentally, only child nodes are normally processed. Then, the processing returns to the original processing.

On the other hand, when the job is the majority-decision type job without the designated number, the job generation notification unit 34 transmits the job generation notification to the default number of servers, which is defined in the job generation notification definition file 35 (step S95). Incidentally, even when one job acquisition refusal notification is received, the job generation notification is transmitted to an alternative server. In addition, the job allocation manager 36 aggregates the calculation results of the majority-decision type job, and registers the calculation result into the job allocation management table 37. When the job is the majority-decision type job with the designated number, the job allocation manager 36 registers respective processing results into child nodes, and registers the aggregation result into the parent node.

Thus, even the majority-decision type job can be handled easily.

Although the embodiment of this invention was described above, this invention is not limited to this embodiment. For example, the functional block diagram shown in FIG. 1 does not always correspond to an actual program module configuration. In addition, as long as the same effect can be obtained, the processing flow can be changed. For example, an order of the processing steps may be exchanged or the steps may be executed in parallel.

In addition, there is a case where functions of the master computer 3 are realized by plural computers.

Furthermore, although only one example of the job generation notification condition stored in the job generation notification definition file 35 was explained, the job generation notification can be carried out in various modes by changing the job generation notification condition. For example, although two modes are switched according to the number of jobs and the number of servers in the aforementioned example, it is possible to switch the processings in more modes. In addition, it is possible to switch the processings by introducing other parameters. Furthermore, there is a case where a condition as to the order to transmit the job generation notification or the like is registered.

Incidentally, the master computer 3 and respective servers are computer devices as shown in FIG. 11. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 11. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A method for allocating a job to one or plural computers among a plurality of computers, without intensively managing a load state of each of said plurality of computers, said method comprising:
   identifying, from among said plurality of computers, one or plural certain computers having a configuration necessary for a processing of a generated job by using a profile management data storage storing data concerning a configuration of each of the plurality of computers;
   identifying a job allocation mode at a current time based on a number of the one or plural certain computers and a number of jobs including the generated job;
   transmitting a job generation notification to at least one of the identified one or plural certain computers according to the identified job allocation mode;
   upon receipt of a job acquisition notification as a response to said job generation notification, registering identification information of a transmission source computer of the identified one or plural certain computers, which sent said job acquisition notification in association with the generated job in a job allocation data storage;
   searching said job allocation data storage to extract a certain job to which a processing result is not registered;
   determining whether duplicate computer allocation to the extracted certain job is allowed; and
   upon determining that the duplicate computer allocation to the extracted certain job is allowed, transmitting another job generation notification to a computer of said plurality of computers, which has a configuration necessary for a processing of the extracted certain job and has capability higher than capability of a computer of said plurality of computers, which currently processes the extracted certain job.

2. A non-transitory computer-readable storage medium storing a program for causing a computer to carry out a procedure to allocate a job to one or plural computers among a plurality of computers, without intensively managing a load state of each of said plurality of computers, said procedure comprising:
   identifying, from among said plurality of computers, one or plural certain computers having a configuration necessary for a processing of a generated job by using a profile management data storage storing data concerning a configuration of each of said plurality of computers;
   identifying a job allocation mode at a current time based on a number of the one or plural certain computers and a number of jobs including the generated job;
   transmitting a job generation notification to at least one of the identified one or plural certain computers according to the identified job allocation mode;
   upon receipt of a job acquisition notification as a response to said job generation notification, registering identification information of a transmission source computer of the identified one or plural certain computers, which sent said job acquisition notification in association with the generated job in a job allocation data storage;
   searching said job allocation data storage to extract a certain job to which a processing result is not registered;
   determining whether duplicate computer allocation to the extracted certain job is allowed; and
   upon determining that the duplicate computer allocation to the extracted certain job is allowed, transmitting another job generation notification to a computer of said plurality of computers, which has a configuration necessary for a processing of the extracted certain job and has capability higher than capability of a computer of said plurality of computers, which currently processes the extracted certain job.

3. A method for managing a job, the method comprising:
   extracting, by using a computer, for a job to be processed, a plurality of processing apparatuses, each of which satisfies a processing requirement of the job, which is allowed to be duplicately processed by the processing apparatuses;
   sending out, by using the computer, same notification concerning the job to each of the extracted plurality of processing apparatuses, wherein the same notification includes data that is sufficient for execution of the job;
   waiting, by using the computer, for each of the extracted plurality of processing apparatuses, receipt of a determination result made in each of the extracted plurality of processing apparatuses in response to the same notification, wherein one or plural processing apparatuses of the extracted plurality of processing apparatuses respectively determine to begin the execution of the job by using the data; and
   upon receipt of one or more specific responses, each of which includes a determination result representing that a response source processing apparatuses of the extracted plurality of processing apparatuses began the execution of the job by using the data, storing, by using the computer, identification information of all of processing apparatuses that sent back the specific responses into a storage device.

4. A non-transitory computer-readable storage medium storing a program for causing a computer to execute a procedure for managing a job, the procedure comprising:
   extracting, for a job to be processed, a plurality of processing apparatuses, each of which satisfies a processing requirement of the job, which is allowed to be duplicately processed by the processing apparatuses;
   sending out same notification concerning the job to each of the extracted plurality of processing apparatuses, wherein the same notification includes data that is sufficient for execution of the job;
   waiting, for each of the extracted plurality of processing apparatuses, receipt of a determination result made in each of the extracted plurality of processing apparatuses in response to the same notification, wherein one or plural processing apparatuses of the extracted plurality of processing apparatuses respectively determine to begin the execution of the job by using the data; and
   upon receipt of one or more specific responses, each of which includes a determination result representing that a response source processing apparatuses of the extracted plurality of processing apparatuses began the execution of the job by using the data, storing identification information of all of processing apparatuses that sent back the specific responses into a storage device.

5. An apparatus for managing a job, the apparatus comprising:
   a storage device;
   a processor configured to execute a procedure, comprising:
      extracting, for a job to be processed, a plurality of processing apparatuses, each of which satisfies a processing requirement of the job, which is allowed to be duplicately processed by the processing apparatuses;
      sending out same notification concerning the job to each of the extracted plurality of processing apparatuses, wherein the same notification includes data that is sufficient for execution of the job;

waiting, for each of the extracted plurality of processing apparatuses, receipt of a determination result made in each of the extracted plurality of processing apparatuses in response to the same notification, wherein one or plural processing apparatuses of the extracted plurality of processing apparatuses respectively determine to begin the execution of the job by using the data; and upon receipt of one or more specific responses, each of which includes a determination result representing that a response source processing apparatuses of the extracted plurality of processing apparatuses began the execution of the job by using the data, storing identification information of all of processing apparatuses that sent back the specific responses into the storage device.

\* \* \* \* \*